US008149251B2

(12) United States Patent
Gregory, Jr. et al.

(10) Patent No.: US 8,149,251 B2
(45) Date of Patent: Apr. 3, 2012

(54) METHODS AND APPARATUS FOR ASSESSING AND MONITORING THE CAPABILITY AND QUALITY OF A COLOR REPRODUCTION SYSTEM

(75) Inventors: H. Scott Gregory, Jr., Kittery Point, ME (US); Robert J. Eller, Webster, NY (US)

(73) Assignee: Exxonmobil Oil Corporation, Irving, TX (US)

( * ) Notice: Subject to any disclaimer, the term of this patent is extended or adjusted under 35 U.S.C. 154(b) by 1219 days.

(21) Appl. No.: 11/865,510

(22) Filed: Oct. 1, 2007

(65) Prior Publication Data

US 2009/0087090 A1    Apr. 2, 2009

(51) Int. Cl.
*G09G 5/10* (2006.01)
(52) U.S. Cl. ......... 345/690; 345/204; 358/1.9; 358/501; 358/518; 358/537; 382/162; 382/167
(58) Field of Classification Search .................. 345/204, 345/690–696; 358/1.9, 504, 509, 518; 382/162, 382/167
See application file for complete search history.

(56) References Cited

U.S. PATENT DOCUMENTS

| 5,818,960 | A | 10/1998 | Gregory, Jr. et al. | |
| 5,877,787 | A | 3/1999 | Edge | |
| 6,748,106 | B1 * | 6/2004 | Bryant et al. | 382/162 |
| 7,207,645 | B2 * | 4/2007 | Busch et al. | 347/19 |
| 7,319,545 | B2 * | 1/2008 | Linder et al. | 358/1.9 |
| 7,751,618 | B2 * | 7/2010 | Matsuura | 382/167 |
| 2005/0093879 | A1 | 5/2005 | Zanghi et al. | |

FOREIGN PATENT DOCUMENTS

| EP | 1 156 666 | 11/2001 |
| WO | 2005/036869 | 4/2005 |
| WO | 2007/071826 | 6/2007 |

OTHER PUBLICATIONS

"Understanding Digital Color", Second Edition, by Phil Green, published by GATF Press, pp. 37-41, including specifically Figure 2.2, 1999.
"Photography-Electronic still picture imaging—Reference Output Medium Metric RGB Color encoding: ROMM-RGB," by Photographic and Imaging Manufacturers Association, Inc., referenced as PIMA 7666: 2001, Mar. 13, 2001.
"Understanding Digital Color", Second Edition, by Phil Green, published by GATF Press, pp. 181-185; 1999.
Color Conversion Algorithms, http://www.cs.rit.edu/~ncs/color/t_convert.html, Sept. 24, 2007.
U.S. Appl. No. 11/080,0391, filed May 4, 2007, Gregory, Jr.
Harville, M. et al., "Consistent Image-Based Measurement and Classification of Skin Color", IEEE International Conference on Image Processing (ICIP), vol. 2 (Sep. 11, 2005), pp. 374-377, XP 010851068.

* cited by examiner

*Primary Examiner* — Quan-Zhen Wang
*Assistant Examiner* — Jennifer Nguyen
(74) *Attorney, Agent, or Firm* — Darryl M. Tyus

(57) ABSTRACT

A color reproduction system comprises a color imaging output device (e.g., monitor, printer, etc.) and its device characterization (e.g., ICC profile, device link, etc.). A method for assessing the capability and accuracy of a color reproduction system is presented. This method may be used to assess the fit between a color reproduction system and its intended use (e.g., proofing, production, etc.). In addition, it may be used to monitor the color accuracy of a color reproduction system over time, thus informing users of the need to recalibrate and/or recharacterize the system.

17 Claims, 4 Drawing Sheets

Target for Assessing the Quality and
Capability of a Color Reproduction System

Target for Assessing the Quality and Capability of a Color Reproduction System

Device Characterization

Quality Assessment Methodology - Tiers

Quality Assessment Guide Methodology

METHODS AND APPARATUS FOR ASSESSING AND MONITORING THE CAPABILITY AND QUALITY OF A COLOR REPRODUCTION SYSTEM

FIELD OF THE INVENTION

Aspects of this disclosure relate to a method for assessment and monitoring of the color quality (color accuracy) and/or color capability (color gamut) of a color reproduction system comprised of a color imaging output device having a device characterization to reproduce color. More particularly, this disclosure relates to such assessment and monitoring methods for color reproduction systems using a target file comprised of image elements that have a color aim, wherein the color aim comprises one or more colors and neutral tones.

BACKGROUND OF THE INVENTION

Today, we depend on a variety of color imaging output devices to reproduce color documents. These devices fulfill a wide variety of roles ranging from extremely color-critical proofing applications to producing convenience prints where approximate color is often "good enough." Users of these devices would like to know whether the colors reproduced by a particular device are accurate and if a wide range of colors that can be reproduced. Also, these users would like to know if these devices are commensurate with the demands of the application before the device is chosen to perform in it. Moreover, even if a device is capable of fulfilling its role at a point in time, users would like to be assured that the reproduced colors by the device are consistent over time.

One approach is to visually evaluate the colors generated by a color imaging output device to determine if they are within an acceptable range. However, the problem with this approach is that the visual inspection is only subjective (based on the personal assessment of an individual) and not based upon a set of objective criteria.

Another approach is to quantify color error by using quantitative measures of color accuracy. Such an approach depends upon the availability of a numeric representation of color. Many methods have been developed to quantify color and provide such a representation. An international organization known as Commission Internationale de l'Eclairge (CIE) developed the basis for several of the most widely used methods.

In 1931, the CIE defined a widely used calorimetric color space, CIE 1931 XYZ color space, which is the basis for all of the quantitative methods is a representation of color where each color is associated with an XYZ tristimulus value. The XYZ tristimulus values are based on a concept that human vision perceives color by mixing the neutral signals of the three types of cells in the retina of the eye which are stimulated by the three primary colors: red (R), green (G), and blue (B). The XYZ tristimulus values are charted in a three-dimensional coordinate space, referred to as a color space. For more information on the XYZ tristimulus values, see "Understanding Digital Color," Second Edition, by Phil Green, published by GATF Press, pages 37-41, including specifically FIG. 2.2, the entire contents of which are incorporated herein by reference.

One method for representation of color using XYZ tristimulus values is known as L*a*b* (CIE 1976 L*a*b* color space). The L*a*b* representation was introduced in an attempt to created a set of numeric color representations that are more visually uniform (i.e. points separated by equal distances in CIE 1976 L*a*b* color space are intended to have similar color differences when perceived by a human observer). In CIE 1976 L*a*b* color space, L indicates lightness of a color, while a and b indicate the chromaticity coordinates of a color in this three-dimensional space. Stated differently, a and b indicate color directions, where +a is the red direction, −a is the green direction, +b is the yellow direction, and −b is the blue direction. L* equal to 0 indicates black, and L* equal to 100 indicates white.

We may use the L*a*b* representation of color to introduce a quantitative measure of the color difference between any two points in this color space. This measure is know as $\Delta E_{ab}$ (said "Delta E ab") and is simply the Euclidian distance between two points in the CIE 1976 L*a*b* color space. $\Delta E_{ab}$ is determined from the following formula:

$$\Delta E^*_{ab} = \sqrt{(L_2^* - L_1^*)^2 + (a_2^* - a_1^*)^2 + (b_2^* - b_1^*)^2}$$

$\Delta E_{ab}$ is frequently used to quantify the degree of mismatch between two colors. If the colors were intended to be the same, the degree of mismatch is also a measure of color error.

The control of the color reproduced by a color imaging output device may have, for example, two components. These components are device calibration and device characterization. The device calibration is used to ensure that the operation of a device is stable and repeatable and may include the adjustment of the device to make it conform to its "as new" condition. The device calibration process typically includes the steps of producing an output of a test image, evaluating the test image, and adjusting the device accordingly. For a digital printer or a conventional printing press, the device calibration may typically include visually evaluating the colorant density and/or the amount of dot gain for a given colorant, and adjusting the machine instruction for that colorant if needed. For a proofing device, the calibration may typically involve measuring the test image with a densitometer, calorimeter or spectrophotometer, and adjusting the hue, colorant density, and dot gain of the device based on its characterization profile or an earlier proof-quality print of the test image. This calibration process may be repeated for each colorant used by the color imaging output device. In a production setting, the re-calibration process for a device may be time consuming and complex, resulting in expensive down-time for the equipment.

The capability of a device to reproduce color depends on the capability of the device itself and on the quality of the device characterization. Device characterization may be utilized to relate the color reproduction characteristics of a device to another reference, such as the relationship between the machine instructions used by a device and the color that a human observer perceives when looking at the result. A color imaging output device, such as a color printer or a color display monitor, may be characterized, for example, using a three step process: 1) reproducing a characterization target file that includes many color image elements, such as color regions or color patches, on the device; 2) measuring these image elements by the use of a calorimeter or a spectrophotometer; and 3) generating a device characterization for the color imaging output device based on the measurements of the color image elements and characterization target. The device characterization is often saved in a file, such as a conventional International Color Consortium (ICC) profile.

An ICC profile is one standard mechanism for representing the color behavior, such as the color space and color gamut, of a color output imaging device. An ICC profile often utilizes a standard color space based on work done by the CIE in 1931 for the reference.

A device characterization captures the color behavior of a device in specific state. In order to maintain the validity of a device characterization, it is important to calibrate a device before it is characterized. In this way, if the device drifts, then it may potentially be brought back to its characterized state through recalibration.

Workflows in the graphic arts may involve several disciplines to obtain a design from creation to final printed copy. Such workflows may start with a designer that creates the artwork. Once this design achieves the desired intent, the artwork may be passed to another discipline that may optimize the design for a printing process. Once the optimization step is complete, the artwork may be passed to a company that may produce the final prints, for example, using some type of printing process.

A goal for such workflows is to effectively communicate color between each device and each participant in the workflow. Color not only should be effectively related between a user's output devices (e.g., a color display and color printer), but also between multiple participants in the workflow, such as a graphic arts designer and a lithographic printer.

Device characterizations may be associated with, or embedded in, color documents in the form of an ICC profile. This may enable color communication between participants in a graphic arts workflow by establishing a specific color for the red, green and blue (collectively, "RGB") or cyan, magenta, yellow and black (collectively, "CMYK") values contained in the document. Ultimately, the accuracy of the color information is dependent on the device characterization and the capability of the color imaging output device.

The color attributes of documents may be defined with RGB or CMYK values. However, RGB or CMYK values by themselves do not communicate a specific color that may be reproduced by a color imaging output device. These values need to be associated with a device characterization, such as a device characterization in an ICC profile, to have a specific color definition which may be reproduced by a color imaging output device.

To reproduce color on a color imaging output device, the RGB or CMYK values specified in a document file are processed by a color management module using the device characterization of the color imaging output device.

There is a need for a method for assessment and monitoring of the color accuracy (color quality) and/or the color gamut (capability) of a color reproduction system to reproduce color. The inventions disclosed herein meet this and other needs.

Prior Patents and Publications

U.S. Pat. No. 5,818,960 to Gregory, Jr. et al., the contents of which are incorporated herein by reference, discloses a process by which the output response of an image processing system having a color printer and a color printer characterization may be linearized by printing a target image having target patches of differing color densities.

U.S. Patent Application Publication No. 2005/0093879 to Zanghi et al., the contents of which are incorporated herein by reference, discloses a system that produces a characterization target for an existing input/output device using fixed control values and dynamically created control values.

SUMMARY OF THE INVENTION

One aspect of this disclosure relate to methods for assessment of the color accuracy of a color imaging output device having a device characterization, comprising the steps of:
(a) inputting a target file and said device characterization into a color management module, wherein said target file comprises image elements each having a color aim;
(b) processing said target file and said device characterization in said color management module to produce a device color definition for each of said image elements;
(c) evaluating said device color definition for said image elements according to the steps of:
  (i) comparing said device color definition to said color aim for each image element, and
  (ii) analyzing said comparisons of step (ii) to produce a quantitative assessment of color accuracy.

In some embodiments, the method further comprising the steps of (d) selecting one or more image elements from said device color definition; and (e) visually evaluating said selected image elements for color accuracy to produce a qualitative assessment of color accuracy. Preferably, the image elements may comprise at least one color from a known color matching system; more preferably, such color is a color standard from the Pantone® Matching system. Preferably, the image elements comprise at least one of a neutral tone as said color aim, a color of low saturation as said color aim, a color of high saturation as said color aim, a color that is repeated as said color aim, or a combination thereof. Selected image elements are printed on paper or displayed on a color monitor for visual evaluation by comparison to subjective color references. Alternatively, said printed or displayed selected image elements are visually evaluated by comparison to a color-accurate print of said first region.

In some embodiments, the device color definition of the image elements of processing step (b) is printed on paper or displayed on a color monitor. The color of said image elements are measured with a spectrophotometer or with a colorimeter, to produce said device color definition that is compared to said color aim.

In other embodiments, the device color definition of each image element is assessed by utilizing the device characterization to calculate a color value which would be a printed or displayed if no further errors were introduced by the printer or monitor.

In other embodiments, the color aim of each of said image elements is in a device independent color space, including the 1976 CIE L*a*b* color space (hereinafter referred to as CIE L*a*b*). The method in some embodiments includes converting said device color definition to CIE L*a*b* color space processing step (b). In some embodiments, the color aim in CIE L*a*b* color space is $L_1^*, a_1^*, b_1^*$ and the device color definition in CIE L*a*b* color space is $L_2^*, a_2^*, b_2^*$.

In still other embodiments, the comparison step (i) comprises the step of calculating a color error between said color aim (CIE $L_1^*, a_1^*, b_1^*$) and said device color definition ($L_2^*, a_2^*, b_2^*$) for each image element in said second region. The color error is the Euclidian distance $\Delta E^*_{ab}$ between said color aim as CIE $L_1^*, a_1^*, b_1^*$ and said device color definition as CIE $L_2^*, a_2^*, b_2^*$, wherein said $\Delta E^*_{ab}$ is determined according to the formula:

$$\Delta E^*_{ab} = \sqrt{(L_2^* - L_1^*)^2 + (a_2^* - a_1^*)^2 + (b_2^* - b_1^*)^2}$$

In still yet other embodiments, the analyzing step (ii) is conducted according to the steps of:
(I) determining the number of acceptable matches by counting the number of image elements having a color error less than or equal to a defined color threshold;
(II) selecting neutral image elements from image elements having a value for L* greater than or equal to 25, a value for a* equal to 0 and a value for b* equal to 0;
(III) calculating a neutral error by averaging said color errors for said selected neutral image elements, and (IV) combining said number of acceptable matches and said neutral error to produce said quantitative assessment of color accuracy.

Preferably, the defined color threshold in step (I) is less or equal to 2.

In still yet other embodiment, the combining step (IV) is determined by dividing said number of acceptable matches by said neutral error to produce said quantitative assessment of color accuracy.

Another aspect of this disclosure relate to methods for assessment of the color accuracy of a color imaging output device having a device characterization, comprising the steps of:
(a) inputting a target file into a color management module, said target file comprises image elements having a color aim;
(b) processing said target file and said device characterization in a color management module to produce a device color definition for each of said image elements;
(c) analyzing said device color definitions according to the steps of:
  (i) calculating a color error between said color aim and said device color definition for each of said image elements;
  (ii) determining the number of acceptable matches by counting the number of image elements having a color error less than or equal to a defined threshold;
  (iii) selecting neutral image elements from image elements having a value for L* greater than or equal to 25, a value for a* equal to 0 and a value for b* equal to 0; and
  (iv) calculating a neutral error by averaging said color error for said selected neutral image elements; and
  (v) combining said number of acceptable matches and said neutral error to produce said quantitative assessment of color accuracy.

Still another aspect of this disclosure relates to a method for adjusting a color reproduction system which comprises a color imaging output device, a device characterization and a file processing path, comprising the steps of:
(a) inputting a target file into a color management module of the file processing path, said target file comprises image elements having a color aim;
(b) processing said target file and said device characterization in a color management module to produce a device color definition for each of said image elements;
(c) printing or displaying the device color definition using the color imaging output device;
(d) analyzing the print or display of said image elements of said device color definitions according to the steps of:
  (i) calculating a color error between said color aim and said device color definition for each of said image elements;
  (ii) determining the number of acceptable matches by counting the number of image elements having a color error less than or equal to a defined threshold;
  (iii) selecting neutral image elements from image elements having a value for L* greater than or equal to 25, a value for a* equal to 0 and a value for b* equal to 0; and
  (iv) calculating a neutral error by averaging said color error for said selected neutral image elements; and
  (v) combining said number of acceptable matches and said neutral error to produce a quantitative assessment of color accuracy;
(e) adjusting at least one of (i) said color imaging output device, (ii) said device characterization, and (iii) said file processing path based on the quantitative assessment of color accuracy. In some embodiments, the color imaging output device is a digital printer and the adjusting step includes adjusting the calibration of said color imaging output device or adjusting the settings of said color imaging output device.

Still yet another aspect of this disclosure relates to a computer product for assessing the color accuracy of a color imaging output device having a color characterization, comprising a computer readable storage medium having a computer program stored thereon, wherein the computer program executes the methods of this disclosure to produce a quantitative assessment of color accuracy.

BRIEF DESCRIPTION OF THE DRAWINGS

This disclosure is further described in the detailed description that follows and in reference to the drawings and the non-limiting examples.

DETAILED DESCRIPTION OF THE INVENTION

Aspects of this disclosure may be directed to methods for assessment and monitoring the capability and quality of a color reproduction system. A color reproduction system comprises a color imaging output device having a device characterization. In one embodiment, a color reproduction system is a digital color printer and its associated printer characterization. In another embodiment, a color reproduction system is a color monitor and its associated monitor characterization.

As used herein, a "device independent color space" means a color space derived from the CIE XYZ (1931) color space, including the CIE L*a*b* color space.

As used herein, a "device characterization" means a computer file that contains information relating to the color space and the color gamut of a specific device in order to characterize a device's color reproduction capabilities.

As used herein, a "color management module" means a color management system that converts color information from an input device having an input device characterization into color information for a color imaging output device having an output device characterization using a device-independent color space.

As used herein, a "device independent color space" means a color space that is intended to be true representations of colors as perceived by the human eye and is not dependent upon any particular device, colorant or substrate (e.g., a printer, inks or paper).

FIG. 1. QAG Target

Figure 1:
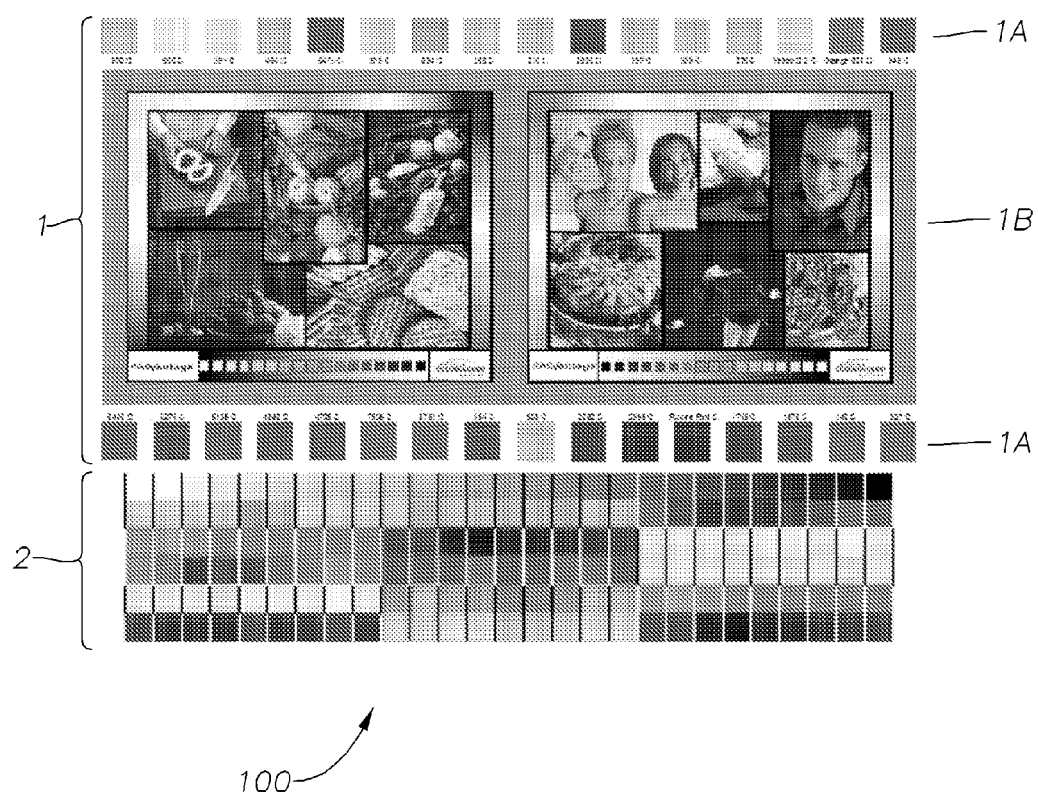
FIG. 1 illustrates a Quality Assessment Guide (QAG) target, which is further defined herein, that may be used in an embodiment of the methods disclosed herein.

FIG. 1 is one embodiment of a target used in the methods for assessment and monitoring of the color accuracy (color quality) and color capability (color gamut) of a color reproduction system, disclosed herein. This method may be referred to herein as the "Quality Assessment Guide" or "QAG." The starting point for applying the QAG methodology to a color reproduction system is an electronic document referred to herein as the "QAG target". An exemplary QAG target 100 is illustrated in FIG. 1. In one or more embodiments of this disclosure, the QAG target 100 is used to generate the data required to execute the steps prescribed by the QAG methodology and to conduct the QAG assessment itself. The multiple regions of the target's design enable a range of assessments to be derived. These assessments may range from subjective and simple, to objective and detailed.

The QAG target 100 is based on an electronic document with a number of characteristics. These characteristics may include a well-defined color definition (color aim). This color definition may provide an objective reference as to how the QAG target 100 may be interpreted and subsequently reproduced.

The well-defined color definition for the QAG target 100 is based on additive RGB primaries in this embodiment but could be represented in any color space large enough to accurately specify all its components. In order to represent a wide range of color imaging output devices, these RGB primaries may have a very high degree of color saturation.

In one embodiment, the RGB color definitions in the QAG target 100 may be defined in the ICC profile of a device independent color space, such as the RGB color space having a gamut that is included in the ICC profile of PHOTOSHOP®, a popular image editing applications from ADOBE, INC. This device independent, wide gamut RGB color space is referred to as ROMM-RGB (US Standard ANSI/I3A IT10.7666:2003). ROMM-RGB is described in "Photography—Electronic still picture imaging—Reference Output Medium Metric RGB Color encoding: ROMM-RGB," by PHOTOGRAPHIC AND IMAGING MANUFACTURERS ASSOCIATION, INC., referenced as PIMA 7666: 2001, dated 13 Mar. 2001, the contents of which are incorporated by reference.

In another embodiment, the RGB color definitions in the QAG target 100 may be defined in the ICC profile of another device independent, large gamut color space, such as the N-component color space, referred to as XOM_CMYK. This N-component color space is described in U.S. Ser. No. 11/800,391, filed 4 May 2007, the contents of which are incorporated herein by reference.

The characteristics of the QAG target 100 may further include the specification of multiple regions to accommodate a tiered approach to methods of this disclosure. The QAG target 100 is comprised of at least two regions: Region 1 and Region 2. Region 1 is referred to as a first region and may be used for a subjective (qualitative) assessment and monitoring of the color quality and/or color capability of a color imaging output device according the methods disclosed herein. Region 2 is referred to as a second region and may be used for objective (quantitative) assessment and monitoring of the color quality and/or color capability of a color imaging output device according the methods disclosed herein.

Region 1 may be further divided into Region 1A and Region 1B.

Region 1A contains a number of color patches whose color aim is defined in a device independent color space of a color specification system. In a preferred embodiment, the color specification system is the PANTONE® Matching System, manufactured and marketed by PANTONE, Inc.

The PANTONE® Matching System is based on books of color patches that sample a wide range of color that may be reproduced under well specified conditions. These may be referred to as "spot color" specifications in the graphic arts. The PANTONE® Matching System supports a number of these spot color libraries for various printing conditions.

Graphic artists often use a color specification system, such as the PANTONE® Matching System, as a mechanism outside of their color design document to communicate a reproduction characteristic for a specific color. These spot colors also have calorimetric specifications that may be translated, for example, into L*a*b* or ROMM-RGB equivalents. (i.e., PANTONE® Color 172 C has device independent L*a*b* values of L equal to 58, a equal to 68, and b equal to 70.)

All the patches in Region 1A have a corresponding L*a*b* specification. When printed through a color imaging output device with good color reproduction characteristics, the patches supplied in the PANTONE® color books may be placed next to the corresponding printed patch and subjectively or objectively evaluated for the quality of a color match.

Region 1B comprises image elements each having a color aim in a device independent color space. In one embodiment, such image elements in Region 1B may comprise a montage of typical real world photographical imagery and synthetic graphical elements.

The photographical imagery in Region 1B may comprise such imagery and elements whose color reproduction characteristics may be easily visually evaluated (e.g., fleshtones, neutral tones, and certain saturated colors which an observer may visually evaluate based solely on his/her memory concerning their expected appearance.)

The synthetic graphical elements in Region 1B may fall into two categories. One category may comprise very precise objective color aims for neutral tones. The second category may comprise a number of graphical color blends between colors sampled from photographical images. These color blends enable critical subjective assessment of the color reproduction state of a color output device. Also, these color blends enable subjective assessment of the ability of the ICC profile of such device to translate the defined color aim into machine instructions which result in visually smooth transitions.

Region 2 in the QAG target may be utilized to obtain an objective (quantitative) measure of color quality and/or color capability. This Region 2 comprises a number of patches which have a certain color and/or neutral tones. These patches may be measured by a color measurement device, such as a calorimeter or a spectrophotometer. Also, these patches may be laid out to facilitate rapid measurement with a spectrophotometer device, such as EYEONE PRO (obtained from X-Rite, Inc.).

A number of these patches may be chosen to have only neutral tones. The remaining patches may be based on a range of colors capable of being reproduced as spot colors, such as those associated with the PANTONE® Matching system.

The color patches in Region 2 may fall into two categories. The first category may be comprised of colors that have low colorfulness (low color saturation). These may be reproducible on a wide range of color imaging output devices. The second category may be comprised of colors that have high colorfulness (high color saturation). These high saturation colors often represent some of the most colorful specifications in the spot color library and may be difficult to reproduce on even highly-capable color imaging output devices.

Some of the patches in Region 2 may be duplicated to assess the capability of a color imaging output device to consistently reproduce the same color.

Figure 2:
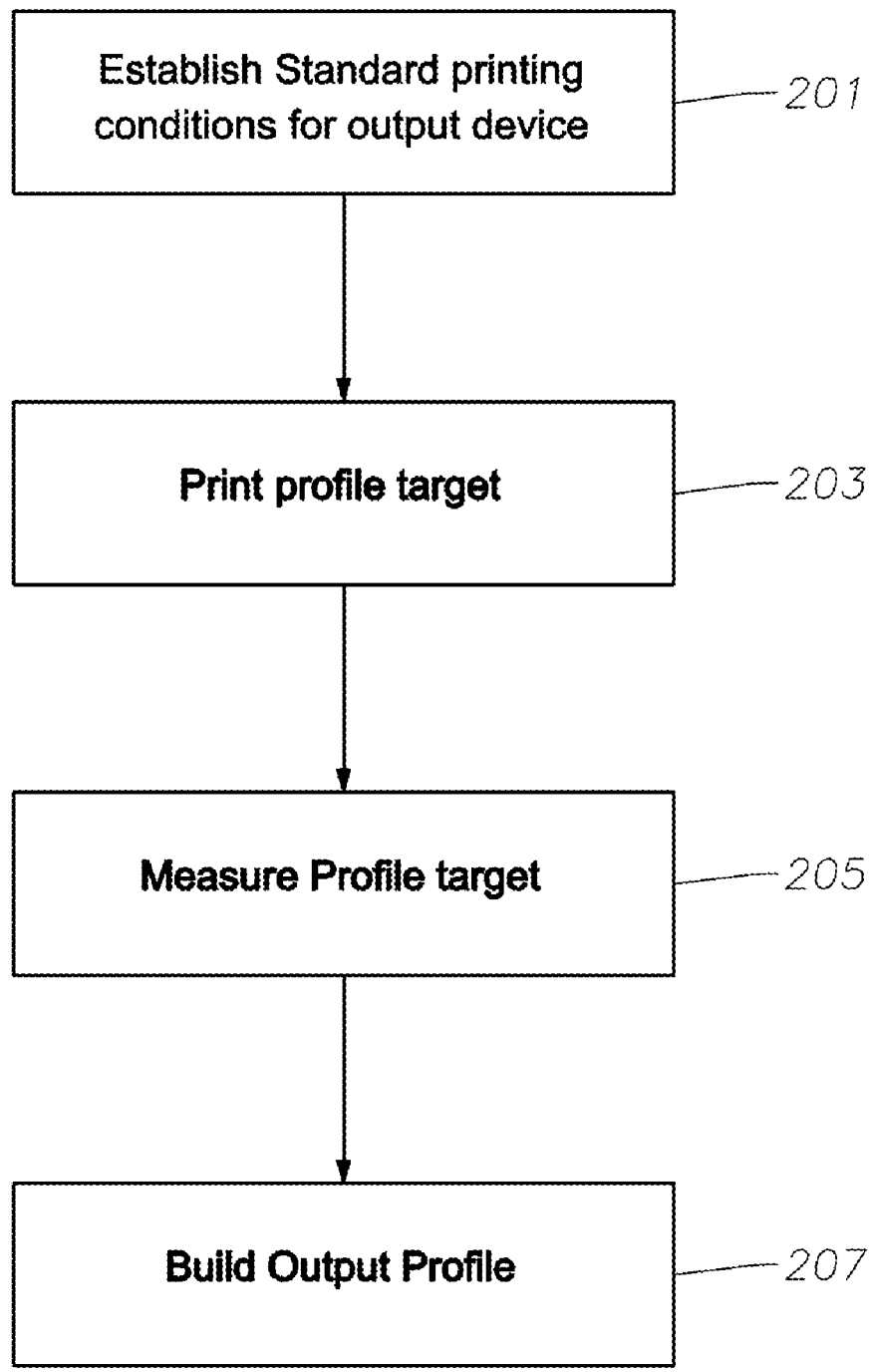
FIG. 2 shows the steps for creating a device characterization for use in an embodiment of the methods disclosed herein.

FIG. 2. Device Characterization

FIG. 2 shows the steps for construction of a device characterization for use in one or more embodiments of the methods for assessment and monitoring of the color quality and/or color capability of a color imaging output device described herein. The device characterization is a computer file that contains information relating to the color space and the color gamut of a specific device in order to characterize a device's color reproduction capabilities. The device characterization for a color imaging output device contains the information necessary to translate a specific input color or color aim into the correct instructions necessary to reproduce that color on such output device.

A device profile, such as one specified by the International Color Consortium (ICC), may be utilized in accordance with this disclosure to represent the device characterization.

Creation of device characterization for a color imaging output device is a practice well known in the field of digital color imaging. It requires a number of steps, such as those steps illustrated in FIG. 2 and explained below:

There are many factors that may influence the output of color imaging output devices of color reproduction systems. In step 201, standard printing conditions for the color imaging output device are established. Standard printing conditions are established in order to control or reduce the impact of these factors. Users may establish such conditions by observing the output device manufacturer's suggestions for optimal operation; by following any of a number of industry recommended best practices; and/or by implementing any of several methods for device calibration that put the operation of a color imaging output device in a well-defined state. For more details on device calibration, see "Understanding Digital Color", Second Edition, by Phil Green, published by GATF Press, pages 181-185, the entire contents of which are incorporated by reference.

In step 203, a profile target is printed. The profile target is a digital file (e.g., an ICC profile) which is used to provide the color data required to construct the device characterization. The software utilized to build the ICC profile (described below) may prescribe such a profile target. This profile target may have patches of color and/or neutral tones that provide the full color gamut that a color imaging output device is capable of reproducing.

In step 205, the printed profile target is measured using a color measurement device. In one embodiment, a spectrophotometer may be used to measure the color of each color patch of the profile target. In another embodiment, a calorimeter may be used to measure the color as tristimulus values of each printed color patch on the profile target. In other embodiments, the color measurement device specified by a commercially available ICC profile building software application, such as ProfileMaker by GRETAGMACBETH®, may be used to measure the color of the printed color patches of the profile target.

In step 207, a device characterization is built for the color output imaging device. This may be done by building a relationship between the color aim of the profile target and the measured tristimulus value for each target. Also, this may be accomplished with a commercially available software application, such as ProfileMaker, that is used to build an ICC profile.

Figure 3:
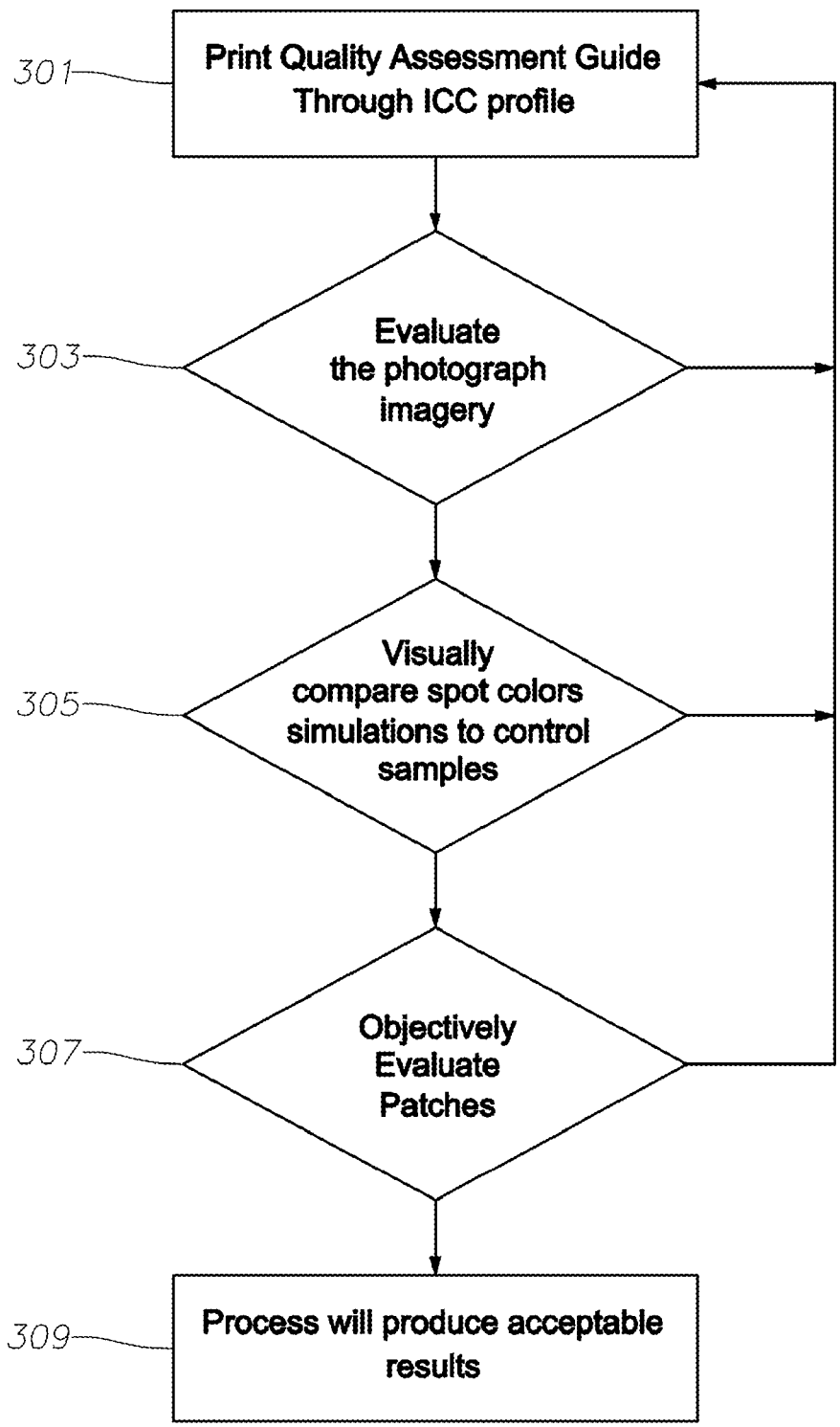
FIG. 3 shows the methodology of the Quality Assessment Guide Methodology in an embodiment of the methods disclosed herein.

FIG. 3 QAG Methodology Tiers

FIG. 3 shows an embodiment of the QAG methodology as a tiered assessment that provides graduated feedback and contains increasing levels of discrimination as to the acceptability of the reproduction of the QAG target. Exemplary assessment tiers for this process are shown in FIG. 3 and described as follows:

In step 301, the QAG target and the device characterization of the color imaging output device being evaluated, as for example an ICC profile, are inputted into a color management module where they are processed to produce a device color definition for the QAG target. The device color definitions of the QAG target are printed or displayed on the color imaging output device being evaluated.

In step 303, the image elements of Region 1B (i.e., photographical imagery and synthetic graphical elements) of the printed or displayed QAG target (QAG target output) are subjectively evaluated. These subjective evaluations are used as a basis for making a judgment of whether the color quality and/or the color capability of the color imaging output device is acceptable. This represents a first tier of review (Tier 1).

First, a judgment may be made of the acceptability of the contrast and gray balance using the synthetic graphical elements having neutral tones in this Region 1B. Second, a judgment may be made regarding the acceptability of the flesh tones and other naturally-occurring objects in the graphical elements. These objects are judged for good contrast, gray balance, and saturation. Third, a judgment may be made regarding whether the high intensity colors have been reproduced with an appropriate level of saturation. Fourth, a judgment may be made regarding the smoothness and consistency of the color reproduction by evaluating the photographic imagery (e.g., color vignettes) in Region 1B. If any image element of Region 1B is judged unacceptable, then corrective action may be taken to adjust the color imaging output device being evaluated. After such corrective action is taken, a new QAG target output may be printed or displayed, and the Tier 1 assessment methodology may be repeated.

If the color reproduction of Region 1B of the QAG target output is judged acceptable the assessment method may either be considered complete and the quality of the reproduction system validated or a more critical assessment may occur at the next tier (Tier 2).

In step 305, the color patches (e.g., spot colors) of Region 1A in the QAG target output are visually compared to color-accurate print of such color patches. The color patches provide an objective measure color reproduction that is visually evaluated. These subjective evaluations are also used as a basis for making a judgment of whether the color quality and/or the color capability of the color imaging output device is acceptable. This represents a second tier of review (Tier 2).

First, a judgment may be made regarding the acceptability of QAG target output that by comparing the color patches reproduced in Region 1A to certified or color-accurate print of the spot colors of the color patches. In one embodiment, the color-accurate prints are from the PANTONE Color Matching System. The certified or color-accurate print of the spot colors of the color patch is placed next to the corresponding patch in Region 1B of the QAG target output, and the color quality of the reproduction is visually assessed.

Second, if any of the printed or displayed color patches in Region 1A are judged to be an unacceptable match to the corresponding certified or color-accurate print of the spot colors of the color patches, then corrective action may be taken to adjust the color imaging output device being evaluated. After such corrective action is taken, a new QAG target output may be printed or displayed, and the Tier 2 assessment methodology may be repeated.

Third, if the printed or displayed spot colors of the color patches in Region 1A of the QAG target output are judged an acceptable match to the certified or color-accurate print of the spot colors, then the assessment method may be considered complete, and the color quality and capability of the color reproduction system deemed validated. Alternatively, a more critical assessment may occur at Tier 3.

In step 307, one embodiment of the method for objectively evaluating the patches of color and neutral tones of the QAG target output for Region 2 includes a number of steps. First, the objective evaluation is implemented by measuring the color of the color patches and analyzing the measurements to generate a quantitative assessment of color accuracy and capability metric. For example, a spectrophotometer, such as the EyeOne Pro (obtained from X-Rite, Inc.), may be used to measure each color patch in the Region 2 of the QAG target output, in a device independent color space, such as L*a*b* or as XYZ tristimulus values. This color data may be collected with a software application, such as Gretagmacbeth MeasureTool (obtained from X-Rite, Inc.). Alternatively, the software application may interface with the spectrophotometer to record the color of each color patch measured.

The color data may then be imported to another software application for analysis. A suitable application for this analysis may be a general-purpose mathematical computing environment, such as MATLAB® (obtained from The Mathworks, Inc.). If the color data is obtained as XYZ tristimulus values, then it may be converted to L*a*b values using standard techniques taught in the literature. From the imported color data (in a device independent color space, such as L*a*b*) using, for example, MATLAB®, the XYZ tristimulus values for each color patch may then be converted to L*a*b* color space using the standard equations published in the literature. See color conversion algorithms at http://www.cs.rit.edu/~ncs/color/t convert.html.

Second, the color aim for each color patch on the QAG target output, defined in a device independent color space, such as for example, L*a*b* color space, is then loaded in to MatLab. The color error between the color aim and the measured color patches is determined as the Euclidian distance $\Delta E^*_{ab}$ between the color aim as $L_1^*, a_1^*, b_1^*$ and said measured color patches as $L_2^*, a_2^*, b_2^*$, wherein said $\Delta E^*_{ab}$ is determined according to the formula:

$$\Delta E^*_{ab} = \sqrt{(L_2^* - L_1^*)^2 + (a_2^* - a_1^*)^2 + (b_2^* - b_1^*)^2}$$

Third, the color error is analyzed according to the steps of: (I) determining the number of acceptable matches by counting the number of color patches (e.g., image elements) having a color error less than or equal to a defined color threshold, (e.g., a defined color threshold of 2); (II) selecting neutral image elements from image elements having a value for L* greater than or equal to 25, a value for a* equal to 0 and a value for b* equal to 0; (III) calculating a neutral error by averaging said color errors for said selected neutral image elements, and (IV) combining the number of acceptable matches and the neutral error to produce the quantitative assessment of color accuracy.

Fourth, when the defined color threshold in less or equal to 2, the combining step (IV) is determined by dividing said number of acceptable matches by said neutral error to produce said quantitative assessment of color accuracy.

In step 309, the quantitative for assessment of color accuracy is evaluated against a specified value or metric, to judge whether acceptable results will be achieved. For example, when the quantitative assessment of color accuracy metric is the number 15, the color imaging output device may be judged unacceptable. Corrective action may be taken, a new QAG target may be printed and the above assessment methodology repeated. If the color imaging output device produces a color accuracy metric of less than a somewhat higher specified value, for example the number 25, but greater than the first specified value of 15, for example, then the device may be judged to be marginal. Acceptable color accuracy metrics for color reproduction systems used for production printing processes, such as a printing press, may have values greater than the second specified value of 25. For example, the color accuracy metric for a printer used for proofing may be the number 50 or greater. The criteria for a metric for an acceptable assessment of color accuracy may be adjusted for the capabilities of a color reproduction process or the quality requirements for different applications.

Figure 4:
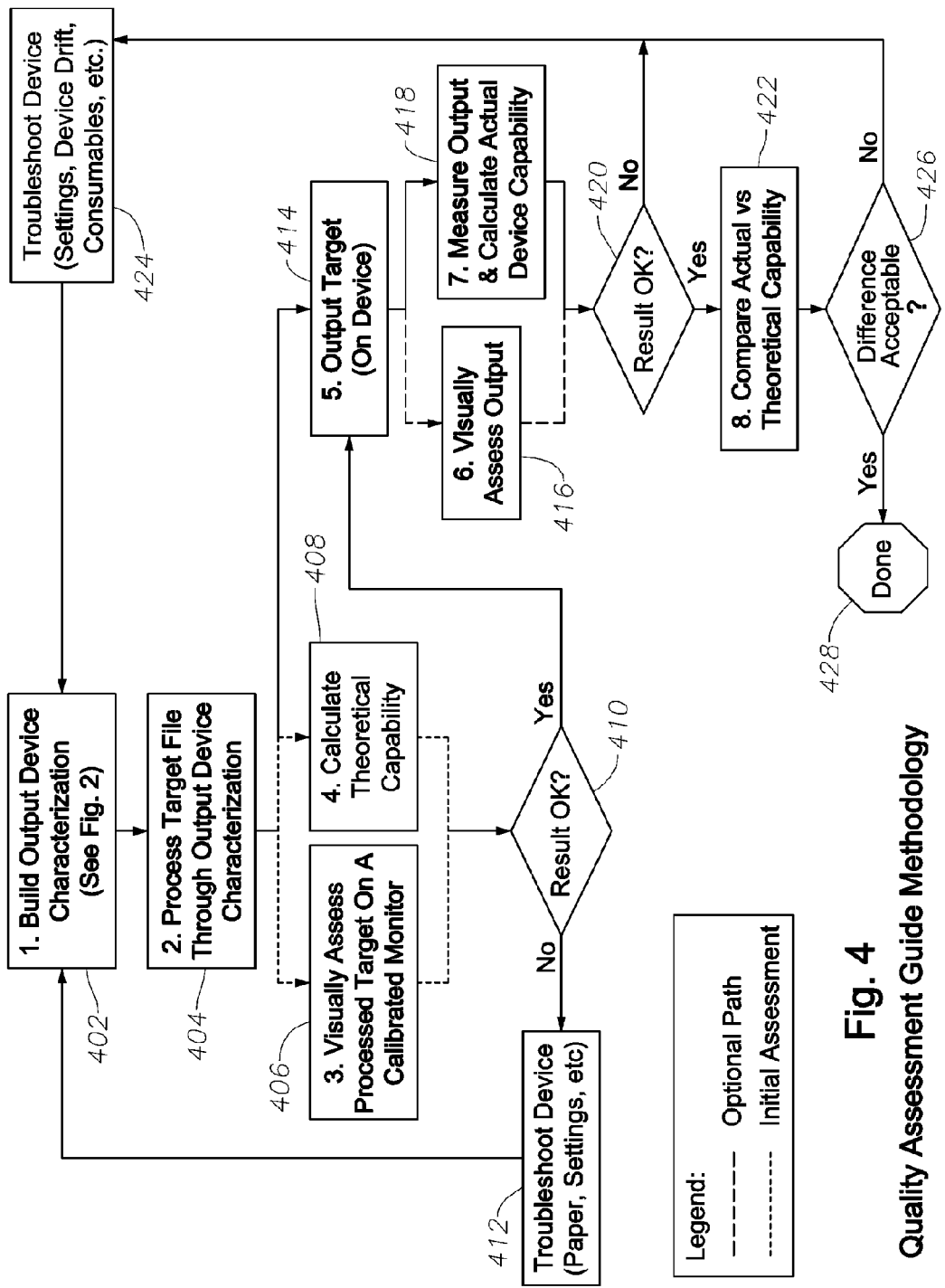
FIG. 4 shows the steps of the overall methodology of the Quality Assessment Guide for one or more embodiments of the methods disclosed herein.

FIG. 4. The Quality Assessment Guide Methodology

FIG. 4 shows the steps of the overall methodology of the Quality Assessment Guide for one or more embodiments of the methods for assessment and monitoring of the color quality and/or color capability of a color imaging output device described herein.

In step 402, a device characterization for the color imaging output device is built in accordance with the procedure described above.

In step 404, the above-described QAG target, and the device characterization for the color imaging output device being evaluated, as an ICC profile, for example, are inputted into a color management module where they are processed to produce a device color definition for the QAG target. In one embodiment, this may be accomplished by opening the QAG target in a software application that supports color management, such as Adobe® Photoshop® and applying the ICC profile for the intended color imaging output device.

In step 406, the device color definition for the QAG target (processed QAG target) is optionally, visually evaluated on a video display monitor that has been previously calibrated for color accuracy as in step 305 above. When this optional step is utilized, it allows the user to conduct an early color accuracy/color quality check of the processed QAG target prior to expending the effort to perform the full color quality assessment and metric. If the processed QAG target fails this visual check, the user may troubleshoot the color reproduction system as discussed in step 412 above. After correcting the issues identified during the troubleshooting process, the user may build a new device characterization and repeat the assessment methodology from step 404 above.

In step 408, the processed QAG target comprises a file having the machine instructions for printing or displaying each pixel of the image elements in such target. In this step, the processed QAG target is further processed to convert these machine instructions into L*a*b* values (by applying the color space model approximated in the device characterization). The resulting theoretical L*a*b* values represent the theoretical capability of the color reproduction system (i.e. the color values which would be produced in a "perfect world" where no additional color reproduction errors are introduced by the color imaging output device). The assessment of color accuracy is determined using these theoretical L*a*b* values to obtain the theoretical capability (e.g., color gamut) of the color reproduction system.

In step 410, if the resulting theoretical assessment of color quality is unacceptable (e.g., the theoretical assessment is too low as compared to the chosen metric), then the user may troubleshoot the color reproduction system as described in step 412 above. If the resulting theoretical assessment of color quality is acceptable (e.g., the theoretical assessment is above the chosen metric), then the processed QAG target is output to the color imaging output device in step 414.

In step 412, the user may troubleshoot the color imaging device or the device characterization (color reproduction system) by checking such things as the quality of the paper used to create the device characterization (for printers), the current settings used in the workflow (e.g., monitor or printer settings, and software settings) and the consumables used in the devices of the workflow (e.g., printer ink). After correcting the issues identified during the troubleshooting process, the user may build a new device characterization of step 402 above, and repeat the method of step 404 above.

In step 414, the color imaging output device is loaded with the ICC profile of the processed QAG target. A physical output (print or screen display) of the processed QAG target file is created from this ICC profile using the standard (display or printer) conditions.

In step 416, the physical output of the processed QAG target file is optionally, visually evaluated as in step 305 above. If it the physical output is visually unacceptable, then the user may troubleshoot the color reproduction system as in step 412 above. After correcting the issues identified during the troubleshooting process, the user may build a new device characterization and repeat the process from step 414 above.

In step 418, the color accuracy of the color imaging output device of the physical output of the processed QAG target is objectively evaluated as in step 307 above. The patches from the physical output of the QAG target file is measured to generate a file of L*a*b* values. These L*a*b* values represent the actual performance of the color reproduction system (including errors introduced by the output device itself). Finally, the user calculates a QAG quality metric using these L*a*b* values to obtain the actual capability of the color reproduction system.

In step 420, if the result is judged to be acceptable, then the color reproduction capability of the device characterization and color imaging output device combination is validated as acceptable for production process. This may ensure that this printing process will accurately reflect the intent communicated by a document's color characteristic as long as it is referenced by a source ICC profile. If the resulting theoretical quality metric is too low, the user may troubleshoot the color reproduction system as described in step 412 above. After correcting the issues identified during the troubleshooting process, the user may build a new device characterization and restart the process from step 402 above.

In step 422, the theoretical and actual color capabilities of the color imaging output device are compared. The user may compare the actual capability obtained in step 418 to the theoretical capability obtained in step 408. Even though the actual capability may be usable, a large difference between actual and theoretical capability could lead the user to troubleshoot the device to reduce this gap as in step 412 above.

In step 426, a determination is made of whether the difference between the theoretical and actual color capabilities are acceptable. If the difference is acceptable, the color reproduction capability of the color imaging output device and its characterization is validated as a proofing device. If they are not acceptable, then the method above is repeated. If they are acceptable, then the assessment method is completed in step 428.

A computer program for executing the methods described herein may be stored in a computer readable storage medium, which may comprise, for example: magnetic storage media such as magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The processes may also be distributed via, for example, downloading over a network such as the Internet.

Still yet another aspect of this disclosure relates to a computer product for assessing the color accuracy of a color imaging output device having a color characterization, comprising a computer readable storage medium having a computer program stored thereon, wherein the computer program executes the methods of this disclosure to produce a quantitative assessment of color accuracy.

In another embodiment of this disclosure, a method for adjusting a color reproduction system is disclosed, the method comprises a color imaging output device, a device characterization and a file processing path, comprising the steps of:
 (a) inputting a target file into a color management module of the file processing path, said target file comprises image elements having a color aim;
 (b) processing said target file and said device characterization in a color management module to produce a device color definition for each of said image elements;
 (c) printing or displaying the device color definition using the color imaging output device;
 (d) analyzing the print or display of said image elements of said device color definitions according to the steps of:
  (i) calculating a color error between said color aim and said device color definition for each of said image elements;
  (ii) determining the number of acceptable matches by counting the number of image elements having a color error less than or equal to a defined threshold;
  (iii) selecting neutral image elements from image elements having a value for L* greater than or equal to 25, a value for a* equal to 0 and a value for b* equal to 0; and
  (iv) calculating a neutral error by averaging said color error for said selected neutral image elements; and
  (v) combining said number of acceptable matches and said neutral error to produce a quantitative assessment of color accuracy;
 (e) adjusting at least one of (i) said color imaging output device, (ii) said device characterization, and (iii) said file processing path based on the quantitative assessment of color accuracy. In some embodiments, the color imaging output device is a digital printer and the adjusting step includes adjusting the calibration of said color imaging output device or adjusting the settings of said color imaging output device.

Preferred embodiments of the present disclosure have been described in terms of a method that would ordinarily be executed by means of a software program. Those skilled in the art will readily recognize that the equivalent of such software may also be constructed in hardware. Because image manipulation algorithms and systems are well known, the present disclosure has been in particular to algorithms and systems forming part of, or cooperating more directly with, the system and method in accordance with the present disclosure. Other aspect of such algorithms and systems, and hardware and/or software for producing and otherwise processing the image signals involved therewith, not specifically shown or described herein, may be selected from such systems, algorithms, components and elements known in the art. Given the system as described according to the invention in the above materials, software not specifically shown, suggested or described herein that is useful for implementation of the disclosure is conventional and within the ordinary skill in such arts.

EXAMPLE

The objective QAG metric of the method for assessment of color accuracy disclosed herein ties together a number of performance attributes into a single response. This metric depends on the availability of data generated during the QAG assessment process. This data below was generated by following the steps enumerated below, as described in FIGS. 2-4 above:

The first step was to build a device characterization for a color imaging output device (i.e., a printer characterization) to be evaluated for color accuracy and color quality as described in FIG. 2.

The second step was to input into a color management module a QAG target file comprised of image elements each having a color aim in a device independent color space and a printer characterization. The QAG target file and printer characterization were processed in the color management module to produce a device color definition data file. The image elements comprised 162 patches which cover a wide range of colors and neutral tones. Many of the colors are beyond the range of colors that most color imaging output devices may reproduce.

For a theoretical assessment of color accuracy and quality, the color definition data file was converted into L*a*b* color values by using the color model approximated in the device characterization, as an ICC profile. The color value of the device color definition is compared to the color aim, and the comparison is analyzed to produce the quantitative assessment of theoretical color accuracy.

For an actual assessment of color accuracy and quality, the color definition data file was then output to a color imaging output device, such as a printer or color monitor, to create a physical output for the QAG target file for measurement.

The third step was to measure each physical target (e.g., a color patch) in the objective region (Region 2) using a Gretag Macbeth Model Eye-One Pro spectrophotometer (commercially available from X-Rite, Incorporated and Gretag Macbeth AG/LLC USA, Grand Rapids, Mich.). These measurements were collected with a Gretagmacbeth's MeasureTool software application (commercially available from X-Rite, Incorporated and Gretag Macbeth AG/LLC USA, Grand Rapids, Mich.). This MeasureTool software application interfaces with the spectrophotometer to record the spectral reflectance of each patch in the objective region.

The fourth step was to import the spectral reflectance data into Matlab, a general-purpose mathematical computing environment used for the analysis (commercially available from The MathWorks, Inc.). In Matlab, the XYZ tristimulus values are calculated from the spectral reflectance data for each color patch and then converted to L*a*b* color space using the standard equations published in the literature as described above.

In the fifth step, the color aim (in CIE L*a*b* values) for each color patch on the QAG target was then loaded in to the Matlab software.

In the sixth step, the color error was determined as the difference between these color aims and the device color definition (theoretical or actual CIE L*a*b* values) using the 1976 CIE L*a*b* color difference know as the Delta $E^*_{ab}$, see "The Reproduction of Colour in Photography, Printing, and Television," Fourth Edition, by R. W. G. Hunt, published by Fountain Press, page 118. In the Delta E color difference metric, the color error is determined as the Euclidian distance $\Delta E^*_{ab}$ between said color aim as $L_1^*$, $a_1^*$, $b_1^*$ and said device color definition as $L_2^*$, $a_2^*$, $b_2^*$, wherein said $\Delta E^*_{ab}$ is determined according to the formula:

$$\Delta E^*_{ab} = \sqrt{(L_2^* - L_1^*)^2 + (a_2^* - a_1^*)^2 + (b_2^* - b_1^*)^2}$$

The seventh step was to find the number of patches wherein the said $\Delta E^*_{ab}$ (Delta E) was less than 2.

The eighth step comprised selecting and identifying the patches having neutral tones (i.e., neutral patches) among the patches in the QAG target (i.e., the patches in which L* was greater than or equal to 25, a* was equal to zero, and b* was equal to zero). The average Delta E for these neutral patches was calculated.

In the final step, the objective QAG metric was determined by dividing the number of patches having a Delta E less than or equal to 2 by the average Delta E for the neutral patches.

Table 1 below contains exemplary data and results for calculating the objective QAG metric.

As shown in Table 1, the number of color patches having a Delta E (color error) less than or equal to 2 was 76.00, the number of selected neutral patches was 22.00, the sum of all neutral errors was 16.46, and the average neutral error was 0.75, to yield a Quantitative Assessment of Quality (color accuracy) metric of 101.56.

TABLE 1

| Patch No. | Aim Color (L*a*b* Color Space) | | | Device Color Definition (L*a*b* Color Space) | | | DeltaE ($\Delta E^*_{ab}$) | Less than 2 DeltaE? 1 = Yes 0 = No | Neutral DeltaE | Selected Neutrals |
|---|---|---|---|---|---|---|---|---|---|---|
| | L* | a* | b* | L* | a* | b* | | | | |
| 1 | 100.00 | 0.00 | 0.00 | 100.00 | 0.00 | 0.00 | 0 | 1 | 0.00 | 1 |
| 2 | 83.14 | −43.00 | −3.00 | 82.97 | −46.31 | −2.03 | 3.45 | 0 | 0.00 | 0 |
| 3 | 58.43 | −17.00 | −12.00 | 58.33 | −15.81 | −11.77 | 1.22 | 1 | 0.00 | 0 |
| 4 | 58.82 | −72.00 | −17.00 | 59.06 | −74.06 | −15.07 | 2.83 | 0 | 0.00 | 0 |
| 5 | 88.24 | −26.00 | −7.00 | 88.34 | −27.40 | −6.23 | 1.60 | 1 | 0.00 | 0 |
| 6 | 32.55 | −30.00 | −6.00 | 32.15 | −32.02 | −6.24 | 2.07 | 0 | 0.00 | 0 |
| 7 | 97.25 | 0.00 | 0.00 | 97.29 | 0.08 | −0.28 | 0.29 | 1 | 0.29 | 1 |
| 8 | 80.00 | −16.00 | −27.00 | 78.87 | −15.04 | −27.40 | 1.53 | 1 | 0.00 | 0 |
| 9 | 61.18 | −1.00 | −28.00 | 61.63 | −1.93 | −27.16 | 1.34 | 1 | 0.00 | 0 |
| 10 | 52.94 | −35.00 | −57.00 | 53.39 | −32.37 | −53.22 | 4.63 | 0 | 0.00 | 0 |
| 11 | 88.24 | −2.00 | −10.00 | 88.16 | −2.92 | −10.74 | 1.19 | 1 | 0.00 | 0 |
| 12 | 23.53 | −3.00 | −28.00 | 23.07 | −2.86 | −29.56 | 1.64 | 1 | 0.00 | 0 |
| 13 | 94.51 | 0.00 | 0.00 | 94.77 | 0.40 | 0.01 | 0.48 | 1 | 0.48 | 1 |
| 14 | 78.82 | 36.00 | −23.00 | 74.88 | 34.91 | −21.48 | 4.37 | 0 | 0.00 | 0 |
| 15 | 60.39 | 21.00 | −11.00 | 59.14 | 17.68 | −9.40 | 3.89 | 0 | 0.00 | 0 |
| 16 | 52.55 | 83.00 | −35.00 | 48.81 | 70.38 | −29.99 | 14.09 | 0 | 0.00 | 0 |
| 17 | 89.41 | 17.00 | −9.00 | 88.83 | 16.89 | −8.68 | 0.67 | 1 | 0.00 | 0 |
| 18 | 23.92 | 4.00 | −24.00 | 23.74 | 1.93 | −25.28 | 2.44 | 0 | 0.00 | 0 |
| 19 | 91.76 | 0.00 | 0.00 | 92.00 | 0.38 | −0.09 | 0.45 | 1 | 0.45 | 1 |
| 20 | 80.39 | 42.00 | −8.00 | 78.32 | 37.92 | −8.23 | 4.58 | 0 | 0.00 | 0 |
| 21 | 52.55 | 25.00 | 0.00 | 53.13 | 22.41 | 0.91 | 2.80 | 0 | 0.00 | 0 |
| 22 | 62.75 | 92.00 | −16.00 | 57.52 | 71.78 | −15.99 | 20.89 | 0 | 0.00 | 0 |
| 23 | 87.84 | 22.00 | 20.00 | 86.36 | 24.72 | 19.82 | 3.10 | 0 | 0.00 | 0 |

TABLE 1-continued

| | Aim Color (L*a*b* Color Space) | | | Device Color Definition (L*a*b* Color Space) | | | DeltaE | Less than 2 DeltaE? 1 = Yes 0 = No | Neutral DeltaE | Selected Neutrals |
|---|---|---|---|---|---|---|---|---|---|---|
| Patch No. | L* | a* | b* | L* | a* | b* | ($\Delta E^*_{ab}$) | | | |
| 24 | 19.22 | 19.00 | −22.00 | 19.99 | 18.36 | −22.81 | 1.28 | 1 | 0.00 | 0 |
| 25 | 89.02 | 0.00 | 0.00 | 89.16 | 0.19 | 0.15 | 0.28 | 1 | 0.28 | 1 |
| 26 | 77.65 | 72.00 | 57.00 | 69.73 | 57.69 | 44.03 | 20.87 | 0 | 0.00 | 0 |
| 27 | 53.73 | 30.00 | 5.00 | 54.63 | 27.75 | 3.48 | 2.87 | 0 | 0.00 | 0 |
| 28 | 56.08 | 80.00 | 46.00 | 54.57 | 74.66 | 43.37 | 6.14 | 0 | 0.00 | 0 |
| 29 | 91.37 | 5.00 | 21.00 | 91.73 | 2.90 | 20.24 | 2.26 | 0 | 0.00 | 0 |
| 30 | 33.33 | 20.00 | −13.00 | 33.55 | 19.91 | −13.20 | 0.31 | 1 | 0.00 | 0 |
| 31 | 85.88 | 0.00 | 0.00 | 85.92 | 0.21 | 0.14 | 0.25 | 1 | 0.25 | 1 |
| 32 | 77.65 | 38.00 | 81.00 | 77.00 | 39.21 | 79.65 | 1.93 | 1 | 0.00 | 0 |
| 33 | 52.16 | 17.00 | 22.00 | 52.64 | 16.95 | 20.27 | 1.80 | 1 | 0.00 | 0 |
| 34 | 61.96 | 74.00 | 69.00 | 59.44 | 69.79 | 59.78 | 10.44 | 0 | 0.00 | 0 |
| 35 | 92.16 | 0.00 | 14.00 | 94.63 | −2.35 | 14.50 | 3.45 | 0 | 0.00 | 0 |
| 36 | 24.71 | 26.00 | −10.00 | 24.78 | 22.83 | −9.81 | 3.18 | 0 | 0.00 | 0 |
| 37 | 83.14 | 0.00 | 0.00 | 82.67 | 0.19 | 0.18 | 0.53 | 1 | 0.53 | 1 |
| 38 | 84.71 | 6.00 | 98.00 | 86.27 | 3.56 | 98.29 | 2.91 | 0 | 0.00 | 0 |
| 39 | 52.16 | 5.00 | 25.00 | 52.23 | 3.30 | 26.31 | 2.15 | 0 | 0.00 | 0 |
| 40 | 60.39 | 52.00 | 75.00 | 60.78 | 52.59 | 71.60 | 3.47 | 0 | 0.00 | 0 |
| 41 | 88.24 | −3.00 | 27.00 | 87.76 | −3.10 | 23.44 | 3.59 | 0 | 0.00 | 0 |
| 42 | 27.84 | 26.00 | 13.00 | 27.82 | 25.85 | 14.84 | 1.84 | 1 | 0.00 | 0 |
| 43 | 80.00 | 0.00 | 0.00 | 79.87 | 0.19 | 0.10 | 0.25 | 1 | 0.25 | 1 |
| 44 | 81.18 | −2.00 | 100.00 | 83.28 | −4.56 | 95.45 | 5.63 | 0 | 0.00 | 0 |
| 45 | 51.37 | −7.00 | 23.00 | 51.63 | −7.96 | 24.63 | 1.91 | 1 | 0.00 | 0 |
| 46 | 63.53 | 9.00 | 71.00 | 64.35 | 9.58 | 66.22 | 4.88 | 0 | 0.00 | 0 |
| 47 | 96.47 | −5.00 | 26.00 | 98.74 | −6.46 | 27.76 | 3.22 | 0 | 0.00 | 0 |
| 48 | 34.51 | 8.00 | 28.00 | 34.62 | 9.59 | 30.09 | 2.63 | 0 | 0.00 | 0 |
| 49 | 77.25 | 0.00 | 0.00 | 77.32 | 0.15 | −0.01 | 0.17 | 1 | 0.17 | 1 |
| 50 | 81.57 | −43.00 | 81.00 | 82.32 | −48.29 | 80.90 | 5.35 | 0 | 0.00 | 0 |
| 51 | 54.12 | −18.00 | 2.00 | 54.75 | −15.74 | 1.66 | 2.37 | 0 | 0.00 | 0 |
| 52 | 61.96 | −82.00 | 42.00 | 62.87 | −87.08 | 40.49 | 5.38 | 0 | 0.00 | 0 |
| 53 | 90.59 | −27.00 | 9.00 | 91.81 | −28.39 | 8.60 | 1.89 | 1 | 0.00 | 0 |
| 54 | 27.84 | −28.00 | 5.00 | 27.83 | −29.73 | 6.89 | 2.56 | 0 | 0.00 | 0 |
| 55 | 74.12 | 0.00 | 0.00 | 73.47 | 0.14 | −0.15 | 0.68 | 1 | 0.68 | 1 |
| 56 | 76.47 | −27.00 | −9.00 | 76.21 | −28.52 | −9.78 | 1.73 | 1 | 0.00 | 0 |
| 57 | 34.51 | −29.00 | −38.00 | 35.63 | −23.55 | −38.08 | 5.57 | 0 | 0.00 | 0 |
| 58 | 40.00 | −19.00 | −15.00 | 39.74 | −19.09 | −14.79 | 0.34 | 1 | 0.00 | 0 |
| 59 | 63.92 | −72.00 | −8.00 | 64.67 | −74.68 | −11.47 | 4.45 | 0 | 0.00 | 0 |
| 60 | 78.43 | −28.00 | −5.00 | 78.83 | −29.31 | −4.81 | 1.39 | 1 | 0.00 | 0 |
| 61 | 70.59 | 0.00 | 0.00 | 70.90 | 0.23 | −0.24 | 0.46 | 1 | 0.46 | 1 |
| 62 | 64.71 | −4.00 | −26.00 | 66.25 | −6.74 | −25.15 | 3.26 | 0 | 0.00 | 0 |
| 63 | 34.90 | −5.00 | −58.00 | 35.87 | −3.14 | −58.90 | 2.28 | 0 | 0.00 | 0 |
| 64 | 43.14 | −6.00 | −21.00 | 44.71 | −6.73 | −20.26 | 1.88 | 1 | 0.00 | 0 |
| 65 | 72.94 | −20.00 | −36.00 | 71.64 | −20.42 | −35.77 | 1.38 | 1 | 0.00 | 0 |
| 66 | 79.22 | −6.00 | −28.00 | 77.47 | −6.71 | −28.87 | 2.07 | 0 | 0.00 | 0 |
| 67 | 67.45 | 0.00 | 0.00 | 67.87 | 0.33 | −0.34 | 0.63 | 1 | 0.63 | 1 |
| 68 | 73.33 | 21.00 | −18.00 | 74.70 | 19.57 | −18.98 | 2.21 | 0 | 0.00 | 0 |
| 69 | 22.35 | 44.00 | −81.00 | 24.80 | 41.19 | −79.55 | 4.00 | 0 | 0.00 | 0 |
| 70 | 40.00 | 15.00 | −25.00 | 39.63 | 14.36 | −25.05 | 0.74 | 1 | 0.00 | 0 |
| 71 | 67.45 | 38.00 | −38.00 | 64.31 | 34.21 | −35.30 | 5.61 | 0 | 0.00 | 0 |
| 72 | 84.71 | 25.00 | −12.00 | 84.53 | 24.95 | −11.85 | 0.24 | 1 | 0.00 | 0 |
| 73 | 63.92 | 0.00 | 0.00 | 63.77 | 0.32 | −0.39 | 0.52 | 1 | 0.52 | 1 |
| 74 | 72.16 | 28.00 | −10.00 | 72.27 | 26.79 | −10.73 | 1.42 | 1 | 0.00 | 0 |
| 75 | 16.08 | 59.00 | −78.00 | 20.32 | 50.63 | −74.55 | 9.99 | 0 | 0.00 | 0 |
| 76 | 48.63 | 27.00 | −13.00 | 49.30 | 26.41 | −14.30 | 1.58 | 1 | 0.00 | 0 |
| 77 | 67.45 | 64.00 | −20.00 | 66.04 | 60.68 | −18.81 | 3.80 | 0 | 0.00 | 0 |
| 78 | 85.88 | 30.00 | 1.00 | 84.60 | 27.93 | −0.53 | 2.88 | 0 | 0.00 | 0 |
| 79 | 60.78 | 0.00 | 0.00 | 61.16 | 0.42 | −0.40 | 0.69 | 1 | 0.69 | 1 |
| 80 | 69.80 | 28.00 | 3.00 | 70.40 | 28.11 | 3.13 | 0.62 | 1 | 0.00 | 0 |
| 81 | 33.73 | 63.00 | −50.00 | 31.64 | 64.31 | −47.05 | 3.85 | 0 | 0.00 | 0 |
| 82 | 41.57 | 31.00 | 6.00 | 43.02 | 29.14 | 6.16 | 2.36 | 0 | 0.00 | 0 |
| 83 | 72.55 | 84.00 | 45.00 | 65.44 | 64.46 | 37.03 | 22.27 | 0 | 0.00 | 0 |
| 84 | 76.86 | 19.00 | 18.00 | 75.72 | 20.30 | 14.97 | 3.49 | 0 | 0.00 | 0 |
| 85 | 56.86 | 0.00 | 0.00 | 57.28 | 0.40 | −0.50 | 0.77 | 1 | 0.77 | 1 |
| 86 | 69.02 | 18.00 | 21.00 | 68.93 | 19.37 | 20.80 | 1.39 | 1 | 0.00 | 0 |
| 87 | 34.51 | 65.00 | 2.00 | 34.50 | 64.55 | 3.19 | 1.27 | 1 | 0.00 | 0 |
| 88 | 41.18 | 26.00 | 16.00 | 41.97 | 25.40 | 14.52 | 1.78 | 1 | 0.00 | 0 |
| 89 | 66.67 | 69.00 | 98.00 | 64.76 | 65.98 | 81.98 | 16.42 | 0 | 0.00 | 0 |
| 90 | 76.86 | 16.00 | 22.00 | 76.50 | 17.22 | 20.64 | 1.87 | 1 | 0.00 | 0 |
| 91 | 53.33 | 0.00 | 0.00 | 54.12 | 0.42 | −0.67 | 1.12 | 1 | 1.12 | 1 |
| 92 | 67.06 | 7.00 | 9.00 | 66.95 | 6.18 | 8.15 | 1.19 | 1 | 0.00 | 0 |
| 93 | 34.12 | 51.00 | 15.00 | 36.05 | 52.16 | 14.36 | 2.34 | 0 | 0.00 | 0 |
| 94 | 46.67 | 16.00 | 23.00 | 47.01 | 16.56 | 21.14 | 1.97 | 1 | 0.00 | 0 |
| 95 | 70.98 | 61.00 | 91.00 | 68.97 | 59.79 | 85.12 | 6.33 | 0 | 0.00 | 0 |
| 96 | 78.04 | 5.00 | 23.00 | 77.35 | 3.90 | 21.97 | 1.65 | 1 | 0.00 | 0 |

TABLE 1-continued

| Patch No. | Aim Color (L*a*b* Color Space) | | | Device Color Definition (L*a*b* Color Space) | | | DeltaE ($\Delta E^*_{ab}$) | Less than 2 DeltaE? 1 = Yes 0 = No | Neutral DeltaE | Selected Neutrals |
|---|---|---|---|---|---|---|---|---|---|---|
| | L* | a* | b* | L* | a* | b* | | | | |
| 97 | 49.41 | 0.00 | 0.00 | 50.18 | 0.45 | −0.86 | 1.24 | 1 | 1.24 | 1 |
| 98 | 72.16 | 0.00 | 30.00 | 71.85 | −2.02 | 29.07 | 2.24 | 0 | 0.00 | 0 |
| 99 | 31.76 | 40.00 | 21.00 | 33.70 | 39.72 | 21.21 | 1.96 | 1 | 0.00 | 0 |
| 100 | 44.71 | −8.00 | 21.00 | 44.78 | −7.62 | 21.85 | 0.93 | 1 | 0.00 | 0 |
| 101 | 75.29 | 0.00 | 94.00 | 77.03 | −2.87 | 87.62 | 7.21 | 0 | 0.00 | 0 |
| 102 | 81.18 | −8.00 | 23.00 | 80.69 | −7.33 | 21.53 | 1.69 | 1 | 0.00 | 0 |
| 103 | 45.10 | 0.00 | 0.00 | 46.81 | 0.32 | −0.71 | 1.89 | 1 | 1.89 | 1 |
| 104 | 72.94 | −7.00 | 27.00 | 72.75 | −5.35 | 26.45 | 1.75 | 1 | 0.00 | 0 |
| 105 | 32.94 | −31.00 | 5.00 | 33.78 | −34.86 | 5.91 | 4.05 | 0 | 0.00 | 0 |
| 106 | 39.61 | −23.00 | 6.00 | 39.86 | −23.32 | 4.48 | 1.58 | 1 | 0.00 | 0 |
| 107 | 72.55 | −39.00 | 77.00 | 75.14 | −40.28 | 77.77 | 2.99 | 0 | 0.00 | 0 |
| 108 | 82.35 | −14.00 | 25.00 | 81.55 | −13.05 | 24.04 | 1.57 | 1 | 0.00 | 0 |
| 109 | 40.78 | 0.00 | 0.00 | 42.80 | 0.42 | −1.02 | 2.30 | 0 | 2.30 | 1 |
| 110 | 48.63 | −68.00 | −10.00 | 50.34 | −65.04 | −7.39 | 4.30 | 0 | 0.00 | 0 |
| 111 | 88.24 | −26.00 | −7.00 | 89.89 | −27.83 | −6.31 | 2.56 | 0 | 0.00 | 0 |
| 112 | 86.67 | −32.00 | −7.00 | 86.95 | −34.92 | −7.26 | 2.95 | 0 | 0.00 | 0 |
| 113 | 58.43 | −17.00 | −12.00 | 59.15 | −16.37 | −11.99 | 0.96 | 1 | 0.00 | 0 |
| 114 | 34.51 | −29.00 | −38.00 | 35.39 | −24.09 | −37.96 | 4.99 | 0 | 0.00 | 0 |
| 115 | 36.86 | 0.00 | 0.00 | 37.67 | 0.45 | −0.99 | 1.35 | 1 | 1.35 | 1 |
| 116 | 38.82 | −1.00 | −69.00 | 40.68 | −1.83 | −66.10 | 3.54 | 0 | 0.00 | 0 |
| 117 | 88.24 | −2.00 | −10.00 | 89.80 | −2.83 | −10.89 | 1.98 | 1 | 0.00 | 0 |
| 118 | 88.24 | −13.00 | −16.00 | 89.17 | −14.57 | −16.78 | 1.99 | 1 | 0.00 | 0 |
| 119 | 61.18 | −1.00 | −28.00 | 62.59 | −2.05 | −27.65 | 1.80 | 1 | 0.00 | 0 |
| 120 | 34.90 | −5.00 | −58.00 | 35.76 | −3.80 | −58.65 | 1.61 | 1 | 0.00 | 0 |
| 121 | 32.16 | 0.00 | 0.00 | 32.88 | −0.06 | 0.16 | 0.75 | 1 | 0.75 | 1 |
| 122 | 40.00 | 69.00 | −57.00 | 38.65 | 62.68 | −54.61 | 6.89 | 0 | 0.00 | 0 |
| 123 | 89.41 | 17.00 | −9.00 | 90.38 | 17.06 | −8.79 | 1.00 | 1 | 0.00 | 0 |
| 124 | 86.67 | 27.00 | −4.00 | 87.00 | 24.94 | −5.22 | 2.42 | 0 | 0.00 | 0 |
| 125 | 60.39 | 21.00 | −11.00 | 60.08 | 17.86 | −9.54 | 3.48 | 0 | 0.00 | 0 |
| 126 | 22.35 | 44.00 | −81.00 | 24.44 | 41.77 | −79.91 | 3.25 | 0 | 0.00 | 0 |
| 127 | 27.06 | 0.00 | 0.00 | 28.26 | −0.42 | −0.56 | 1.39 | 1 | 1.39 | 1 |
| 128 | 45.49 | 85.00 | −31.00 | 44.52 | 75.83 | −27.03 | 10.04 | 0 | 0.00 | 0 |
| 129 | 87.84 | 22.00 | 20.00 | 88.10 | 24.38 | 20.26 | 2.40 | 0 | 0.00 | 0 |
| 130 | 88.24 | 18.00 | 39.00 | 88.05 | 20.20 | 40.19 | 2.51 | 0 | 0.00 | 0 |
| 131 | 52.55 | 25.00 | 0.00 | 53.27 | 23.41 | 0.94 | 1.99 | 1 | 0.00 | 0 |
| 132 | 16.08 | 59.00 | −78.00 | 19.97 | 50.94 | −74.73 | 9.53 | 0 | 0.00 | 0 |
| 133 | 21.57 | 0.00 | 0.00 | 22.35 | −0.05 | −0.28 | 0.83 | 1 | 0.00 | 0 |
| 134 | 47.45 | 85.00 | 7.00 | 45.08 | 81.53 | 10.71 | 5.61 | 0 | 0.00 | 0 |
| 135 | 91.37 | 5.00 | 21.00 | 93.09 | 2.59 | 21.32 | 2.97 | 0 | 0.00 | 0 |
| 136 | 90.20 | 6.00 | 100.00 | 92.20 | 3.24 | 102.92 | 4.49 | 0 | 0.00 | 0 |
| 137 | 53.73 | 30.00 | 5.00 | 54.64 | 28.94 | 3.96 | 1.75 | 1 | 0.00 | 0 |
| 138 | 33.73 | 63.00 | −50.00 | 31.32 | 64.63 | −47.39 | 3.90 | 0 | 0.00 | 0 |
| 139 | 15.29 | 0.00 | 0.00 | 17.06 | −1.18 | 0.94 | 2.32 | 0 | 0.00 | 0 |
| 140 | 50.20 | 73.00 | 44.00 | 51.08 | 75.25 | 42.00 | 3.14 | 0 | 0.00 | 0 |
| 141 | 92.16 | 0.00 | 14.00 | 95.96 | −2.85 | 15.41 | 4.95 | 0 | 0.00 | 0 |
| 142 | 91.37 | 1.00 | 113.00 | 93.39 | 0.76 | 109.84 | 3.76 | 0 | 0.00 | 0 |
| 143 | 52.16 | 17.00 | 22.00 | 52.92 | 17.32 | 20.42 | 1.78 | 1 | 0.00 | 0 |
| 144 | 34.51 | 65.00 | 2.00 | 34.16 | 64.35 | 3.75 | 1.90 | 1 | 0.00 | 0 |
| 145 | 9.02 | 0.00 | 0.00 | 11.94 | −0.40 | 1.17 | 3.17 | 0 | 0.00 | 0 |
| 146 | 43.92 | 49.00 | 47.00 | 45.41 | 49.19 | 47.88 | 1.74 | 1 | 0.00 | 0 |
| 147 | 88.24 | −3.00 | 27.00 | 88.86 | −3.18 | 23.34 | 3.71 | 0 | 0.00 | 0 |
| 148 | 90.98 | −10.00 | 106.00 | 94.82 | −9.16 | 107.11 | 4.09 | 0 | 0.00 | 0 |
| 149 | 52.16 | 5.00 | 25.00 | 52.54 | 3.57 | 27.35 | 2.78 | 0 | 0.00 | 0 |
| 150 | 34.12 | 51.00 | 15.00 | 35.31 | 51.97 | 14.87 | 1.55 | 1 | 0.00 | 0 |
| 151 | 2.75 | 0.00 | 0.00 | 5.86 | −0.53 | 0.32 | 3.17 | 0 | 0.00 | 0 |
| 152 | 50.20 | 27.00 | 58.00 | 51.50 | 27.69 | 57.46 | 1.58 | 1 | 0.00 | 0 |
| 153 | 96.47 | −5.00 | 26.00 | 99.82 | −6.61 | 28.22 | 4.33 | 0 | 0.00 | 0 |
| 154 | 88.24 | −23.00 | 99.00 | 89.00 | −24.70 | 98.40 | 1.96 | 1 | 0.00 | 0 |
| 155 | 51.37 | −7.00 | 23.00 | 51.85 | −8.07 | 25.96 | 3.18 | 0 | 0.00 | 0 |
| 156 | 31.76 | 40.00 | 21.00 | 32.97 | 39.58 | 21.15 | 1.28 | 1 | 0.00 | 0 |
| 157 | 0.00 | 0.00 | 0.00 | 4.66 | −0.07 | −0.50 | 4.69 | 0 | 0.00 | 0 |
| 158 | 47.06 | −65.00 | 23.00 | 47.19 | −64.64 | 22.20 | 0.89 | 1 | 0.00 | 0 |
| 159 | 90.59 | −27.00 | 9.00 | 92.72 | −29.13 | 8.17 | 3.12 | 0 | 0.00 | 0 |
| 160 | 90.20 | −29.00 | 59.00 | 91.73 | −32.89 | 61.01 | 4.64 | 0 | 0.00 | 0 |
| 161 | 54.12 | −18.00 | 2.00 | 54.93 | −16.46 | 1.92 | 1.74 | 1 | 0.00 | 0 |
| 162 | 32.94 | −31.00 | 5.00 | 32.79 | −35.19 | 6.61 | 4.49 | 0 | 0.00 | 0 |
| | | | | | | | | 76 | 16.46 | 22 |

| | |
|---|---|
| Number of patches less than 2 DeltaE | 76.00 |
| Sum of all neutral errors | 16.46 |
| Number of selected neutral patches | 22.00 |
| Average neutral error | 0.75 |
| Quantitative Assessment of Quality | 101.56 |

It is noted that the foregoing examples have been provided merely for the purpose of explanation and are in no way to be construed as limiting of this disclosure. While this disclosure has been described with reference to an exemplary embodiment, it is understood that the words which have been used herein are words of description and illustration, rather than words of limitation. Changes may be made, within the purview of the appended claims, as presently stated and as amended, without departing from the scope and spirit of this disclosure in its aspects. Although this disclosure has been described herein with reference to particular means, materials and embodiments, this disclosure is not intended to be limited to the particulars disclosed herein; rather, the present invention extends to all functionally equivalent structures, methods and uses, such as are within the scope of the appended claims.

What is claimed is:

1. A method for assessment of the theoretical color accuracy of a color imaging output device having a device characterization, comprising the steps of:
   (a) inputting a target file and said device characterization into a color management module, wherein said target file comprises image elements each having a color aim;
   (b) processing said color aim for said image elements and said device characterization in said color management module to produce a device color definition for each of said color aim;
   (c) evaluating said device color definition for each of said color aim according to the steps of:
      (i) converting said device color definition to a color value by using the color model represented in the device characterization, and
      (ii) comparing said color value of said device color definition to said color aim, and calculating a color error between said color aim and said device color definition for each of said selected image elements, and
      (iii) analyzing said comparisons of step (ii) to produce a quantitative assessment of theoretical color accuracy;
   wherein said color error is the Euclidian distance $\Delta E^*_{ab}$ between said color aim as $L_1^*, a_l^*, b_1^*$ and said device color definition as $L_2^*, a_2^*, b_2^*$, wherein said $\Delta E^*_{ab}$ is determined according to the formula:

$$\Delta E^*_{ab} = \sqrt{(L_2^* - L_1^*)^2 + (a_2^* - a_1^*)^2 + (b_2^* - b_1^*)^2}; \text{ and}$$

wherein the analyzing step (ii) is conducted according to the steps of:
   (I) selecting one or more image elements from said target file for the purpose of calculating a quantitative assessment of color accuracy;
   (II) determining the number of acceptable matches by counting the number of selected image elements having a color error less than or equal to a defined color threshold;
   (III) further selecting neutral image elements from selected image elements, wherein said selected image elements have a value for L* greater than or equal to 25, a value for a* equal to 0, and a value for b* equal to 0;
   (IV) calculating a neutral error by averaging said color errors for said selected neutral image elements, and
   (V) combining said number of acceptable matches and said neutral error to produce said quantitative assessment of color accuracy.

2. The method of claim 1, wherein the analysis step (ii) is conducted according to the steps of:
   (a) calculating a neutral error by averaging said color errors for a selected group of image elements, and
   (b) determining the number of acceptable matches by counting the number of image elements having a color error less than or equal to a defined threshold, and
   (c) combining said number of acceptable matches and said neutral error to produce said quantitative assessment of color quality.

3. The method of claim 1, wherein said color aim of each of said image elements is in a device independent color space, said device independent color space is L*a*b* color space, said L*a*b* color space is $L_1^*, a_1^*, b_1^*$.

4. The method of claim 3, wherein processing step (b) includes converting said device color definition to L*a*b* color space, said L*a*b* color space is $L_2^*, a_2^*, b_2^*$.

5. The method of claim 4, wherein the comparison step (i) comprises the step of calculating a color error between said color aim ($L_1^*, a_1^*, b_1^*$) and said device color definition ($L_2^*, a_2^*, b_2^*$) for each of said image elements.

6. The method of claim 1, wherein said defined color threshold in step (II) is less or equal to 2.

7. The method of claim 6, wherein the combining step (V) is determined by dividing said number of acceptable matches by said neutral error to produce said quantitative assessment of color accuracy.

8. The method of claim 1, wherein said color is measured with a colorimeter or a spectrophotometer to produce said device color definition of calculating step (i).

9. A method for assessment of the color accuracy of a color imaging output device having a device characterization, comprising the steps of:
   (a) inputting a target file into a color management module, said target file comprises image elements each having a color aim;
   (b) processing said target file and said device characterization in a color management module to produce a device color definition for each of said image elements;
   (c) analyzing said device color definitions according to the steps of:
      (i) selecting one or more image elements;
      (ii) calculating a color error between said color aim and said device color definition for each of said selected image elements;
      (iii) determining the number of acceptable matches by counting the number of selected image elements having a color error less than or equal to a defined threshold;
      (iv) selecting neutral image elements from selected image elements having a value for L* greater than or equal to 25, a value for a* equal to 0 and a value for b* equal to 0; and
      (v) calculating a neutral error by averaging said color errors for said selected neutral image elements; and
      (vi) combining said number of acceptable matches and said neutral error to produce said quantitative assessment of color accuracy.

10. The method of claim 9, wherein said image elements comprise an image element having a neutral tone as said color aim, an image element having a color of low saturation as said color aim, an image element having a color of high saturation as said color aim, an image element having a color that is repeated as said color aim, or combinations thereof.

11. The method claim 10, wherein said device color definition for each of said image elements referenced in processing step (b) is obtained by printing said image element on paper and measuring the color of said printed image element.

12. The method of claim 11, wherein said color is measured with a colorimeter or a spectrophotometer to produce said device color definition of calculating step (i).

13. The method claim 9, wherein said device color definition for each of said image elements referenced in processing step (b) is obtained by displaying said image element on a color monitor and measuring the color of said displayed image element.

14. The method of claim 9, wherein each of said image elements have a color aim in a device independent color space.

15. A computer product for assessing the color accuracy of a color imaging output device having a color characterization, comprising a computer readable storage medium having a computer program stored thereon, wherein the computer program executes the method of claim 9 to produce a quantitative assessment of color accuracy.

16. A method for adjusting a color reproduction system which comprises a digital printer, a device characterization and a file processing path, comprising the steps of:
   (a) inputting a target file into a color management module of the file processing path, said target file comprises image elements having a color aim;
   (b) processing said target file and said device characterization in a color management module to produce a device color definition for each of said image elements;
   (c) printing the device color definition using said digital printer;
   (d) analyzing the print of said image elements of said device color definitions according to the steps of:
      (i) calculating a color error between said color aim and said device color definition for each of said image elements;
      (ii) determining the number of acceptable matches by counting the number of image elements having a color error less than or equal to a defined threshold;
      (iii) selecting neutral image elements from image elements having a value for L* greater than or equal to 25, a value for a* equal to 0 and a value for b* equal to 0; and
      (iv) calculating a neutral error by averaging said color error for said selected neutral image elements; and
      (v) combining said number of acceptable matches and said neutral error to produce a quantitative assessment of color accuracy;
   (e) adjusting at least one of (i) said digital printer, (ii) said device characterization, and
   (iii) said file processing path based on the quantitative assessment of color accuracy.

17. The method of claim 16, wherein the adjusting step includes adjusting the calibration of said color imaging output device or adjusting the settings of said color imaging output device.

* * * * *